United States Patent Office 3,711,422
Patented Jan. 16, 1973

3,711,422
CRACKING CATALYST RESTORATION WITH ANTIMONY COMPOUNDS
Marvin M. Johnson and Donald C. Tabler, Bartlesville, Okla., assignors to Phillips Petroleum Company, Bartlesville, Okla.
No Drawing. Filed Sept. 8, 1970, Ser. No. 70,476
Int. Cl. B01j 11/70, 11/72
U.S. Cl. 252—414                                    10 Claims

ABSTRACT OF THE DISCLOSURE

A method of restoring activity to cracking catalysts which have been contaminated with metals which involves passivating the metals by contacting them with antimony-containing compounds and restoring the catalyst activity thereafter by conventional calcination techniques.

---

This invention relates to cracking catalyst activity restoration.

In one of its more specific aspects, this invention relates to a method of restoring the activity of metal-contaminated cracking catalysts.

In conventional catalytic cracking processes in which hydrocarbon feedstocks are cracked to produce light distillates, a gradual deterioration in the cracking ability of the catalyst occurs. Some of this deterioration is attributable to the deposition on the catalyst of metals contained within the charge stock. The deposition of these metals, which include nickel and vanadium, tends to decrease the production of 400° F. E.P. material, to increase coke production and to increase cracking depth as indicated by hydrogen production.

The present invention provides a method by which catalyst life and desired yields can be prolonged and increased, respectively. According to this invention there is provided a method of restoring the activity of cracking catalysts in which the spent catalyst is contacted with an antimony-containing compound convertible to antimony oxide upon calcination, and the catalyst is then regenerated in the usual manner.

The method of this invention is applicable to conventional catalytic cracking operations using conventional cracking catalysts as applied to the cracking of hydrocarbons for the production of blending components for motor fuels.

Such conventional cracking operations are generally carried out at temperatures between 800 and about 1200° F. at pressures within the range of subatmospheric to several hundred atmospheres.

The conventional cracking catalysts generally contain silica or silica-alumina, which materials are frequently associated with zeolitic materials. The zeolitic portions of such catalysts can have been ion exchanged to provide metallic ions which influence the activity of the catalyst. Rare earth metals, including cerium, are frequently used for this purpose.

The feedstocks concerned herein are those conventionally employed and are most frequently petroleum-derived hydrocarbons having an initial boiling point above the gasoline boiling point range and include such materials as gas oils, fuel oils, residuums and the like.

The method of this invention may be considered as one in which treating agents are brought into contact with the used catalyst, used in that it no longer produces optimum yields because of the presence of contaminating metals, to passivate these contaminating metals and to restore the catalyst to near its original activity.

The treating agents employed by the invention are compounds of antimony. These compounds are either the oxides or those which are convertible to the oxides upon calcination.

The treating agents can be employed in any method which brings them into contact with the catalyst to deposit them on the catalyst. Such methods include impregnation, dry mixing or deposition from suitable carrying agents.

Impregnation is the preferred method and can be carried out using either aqueous or nonaqueous solutions. For example, an aqueous solution of $Sb_2O_3$ can be used; relatedly, nonaqueous solutions such as a benzene solution of a trihydrocarbyl-substituted antimony can be used.

If a carrying agent is employed, a suitable antimony compound treating agent is conveniently dissolved and dispersed in a hydrocarbon such as the charge stock to the cracking process and the contact made at about cracking temperature.

The amount of the treating agent employed will depend upon the extent of metal contamination of the catalyst or the quantity of metal contaminants in the feed. Generally, the treating agent is applied to the catalyst in amounts of less than about 1 weight percent of the weight of the cracking catalyst. It is generally preferred to provide an amount of antimony in the range of from about 0.1 to about 2 moles per mole of contaminating metal present in the feed or present on the cracking catalyst. Amounts greater than this can be used, however. Relatedly, if the antimony treating agent is incorporated in the feed, the amount so employed will be dependent upon the metal-contaminant content of the feed. Generally, an amount of antimony treating agent in the range of from about 0.1 to about 5000 p.p.m. of feed is satisfactory.

After the antimony-treating agent has been deposited on the catalyst, the catalyst is activated according to conventional methods, these methods generally involving heating to elevated temperatures of from about 800° F. to about 1500° F. in the presence of free oxygen-containing gases, as a result of which the antimony treating agent, if not already in the form of the oxide, is converted to the oxide.

The following examples illustrate preferred embodiments for carrying out the invention but are not to be considered as limiting the invention to the specifics involved.

EXAMPLE I

In these data, five catalysts are compared, the catalysts being derived from the same original commercial catalyst.

Catalyst I was a commercially-available cracking catalyst, Davison XZ–25, available from Davison Chemical, Division of W. R. Grace & Co., Baltimore, Md. It is a mole sieve-modified silica-alumina catalyst prepared by incorporating a small amount of the mole sieve, a cerium-exchanged zeolitic material, into silica-alumina gel and spray drying to form spheres about 60 microns in diameter and containing about 31 percent alumina. This catalyst was steam-aged to simulate prolonged cracking service, its surface area being reduced to about 80 m.²/gm. As such, Catalyst I represents aged cracking catalyst unaffected by metal contamination.

Catalyst II was prepared by impregnating a portion of Catalyst I with 1000 p.p.m. nickel. Accordingly, Catalyst II represents aged cracking catalyst which has become metal contaminated.

Catalyst III was prepared by impregnating a 7 gram portion of Catalyst II with an antimony-containing aqueous solution. The impregnating solution was prepared by combining 3.8 g. of $Sb_2O_3$, 20 g. of tartaric acid, 90 ml. of water and 10 ml. concentrated $HNO_3$. This mixture was heated and stirred until a clear solution resulted. The solution was cooled and its volume brought to 200 ml. by the addition of water. A 2 ml. quantity of this solution was added to the 7 gram portion of the catalyst, enough additional water being added to form a paste. The mixture was then dried at 110° C. and then calcined at 900° F. for 3 hours. The resulting catalyst contained about 0.5 weight percent $Sb_2O_3$. As such, Catalyst III represents an aged, metal-contaminated catalyst which has been restored by the method of this invention and, at the time of use, contained 2 moles of antimony per mole of nickel.

Catalyst IV was prepared by impregnating a 7 gram portion of Catalyst II with an antimony-containing nonaqueous solution. The method employed was comparable to that used for preparing Catalyst III, but in this instance the 7 gram portion of Catalyst II was contacted with 1 ml. of 0.25 molar triphenylantimony cyclohexane solution together with sufficient additional cyclohexane to form a smooth slurry. The mixture was then evaporated to remove the volatile solvent and thereafter calcined. As such, Catalyst IV represents an aged, metal-contaminated catalyst which has been restored by the method of this invention and, at the time of use, contained 2 moles of antimony per mole of nickel.

Catalyst V was prepared by impregnating a 7 gram portion of Catalyst II with an arsenic-containing nonaqueous solution. The method employed was comparable to that used for preparing Catalyst IV but in this instance a triphenyl-arsenic solution was employed. As such, Catalyst V represents an aged, metal-contaminated catalyst which was not treated by the method of this invention. At the time of its use, it contained 2 moles of arsenic per mole of nickel.

Each of the catalysts described was subjected to a regeneration cycle at 1100° F. and then tested for cracking activity by being employed, individually, in a fixed bed reactor at 900° F. using a gas-oil feedstock. The feedstock had a distillation range from about 550° F. to about 1070° F. and contained 0.3 p.p.m. nickel. Each catalyst was tested under comparable conditions.

Additionally, Catalyst IV was employed under the same conditions after having been regenerated at 1250° F.

The results of these runs are indicated in Table I. Each result, except that relative to coke yield, is the average of three runs, one run being carried out at each of 7, 21 and 51 weight hourly space velocities. In these data, "conversion" is the percentage yield of those materials, gaseous and liquid, having an end point less than 400° F. "Gasoline" is that product including pentanes through 400° F. end point material.

TABLE I

| Catalyst No. | Conversion, vol. percent | Selectivity to gasoline, vol. percent | Coke yield, weight percent of feed | H₂ yield s.c.f./bbl. feed converted |
|---|---|---|---|---|
| I | 81.2 | 75.8 | 7.7 | 27 |
| II | 75.8 | 54.7 | 13.0 | 501 |
| III | 71.2 | 60.3 | 8.3 | 394 |
| IV (1100° F. regeneration) | 76.9 | 57.8 | 7.8 | 248 |
| IV (1250° F. regeneration) | 79.6 | 61.7 | | 191 |
| V | 61.7 | 49.4 | 10.5 | 630 |

The above data show that when nickel is added to the aged cracking catalyst (Catalyst II), there results an increase in coke and hydrogen and a decrease in gasoline production as compared to the nickel-free Catalyst I.

However, the method of this invention, as exemplified by Catalyst III, significantly offsets the effects of the nickel as shown by the reduction in production of hydrogen and coke and by the increase in gasoline production. With Catalyst IV, produced by nonaqueous impregnation, there is a further reduction in hydrogen and coke yields with a corresponding increase in gasoline yields. This occurs employing either the lower or higher regeneration temperatures.

In contrast, however, Catalyst V, impregnated with arsenic, was ineffective in restoring yields to their preferred levels.

EXAMPLE II

Catalyst II, as prepared in Example I and containing 1000 p.p.m. nickel, was employed to crack that feedstock employed in Example I. In this run, the antimony treating agent was introduced continuously into contact with the catalyst by incorporating triphenylantimony in the feed, the introduction being made during a number of process cycles comprised of 28 minute periods. During the run, the antimony concentration of the catalyst increased from a value of 0 at the start of the run. At various concentrations of antimony on the catalyst, samples of catalyst were removed from the fluid catalytic cracking unit and evaluated in a fixed bed cracking unit.

The fluid catalytic cracking unit into which triphenylantimony was introduced with the feed was conducted at a reaction temperature of 900° F. and a regeneration temperature of 1100° F., the catalyst to oil ratio being 5.7 pounds of catalyst per pound of feed.

The fixed bed catalytic cracking unit into which the catalyst was transferred for evaluation purposes was operated at 900° F. and atmospheric pressure. The feed was an antimony-free gas oil.

Results are presented in Table II. In each instance, except that relative to coke yield, the data represent the average of three runs, one run being made at each of 7, 21 and 51 weight hourly space velocities. Results are expressed in the terms as previously defined.

TABLE II

| Fluid bed operation: Moles antimony introduced to catalyst/mole nickel originally on catalyst | 0 | 0.57 | 1.0 | 1.51 | 2.0 | 2.0 |
|---|---|---|---|---|---|---|
| Fixed bed operation: | | | | | | |
| Conversion, vol. percent | 75.8 | ¹ 62.7 | 65.6 | 69.9 | 67.5 | ² 69.7 |
| Selectivity to gasoline, vol. percent | 54.5 | 66 | 67.1 | 71.7 | 62.7 | 65.5 |
| Hydrogen yield, s.c.f./bbl. feed converted | 509 | 394 | 253 | 164 | 200 | 176 |
| Coke yield, wt. percent of feed | 13 | 8.2 | 6.6 | 6.7 | 8.0 | 7.6 |

¹ Forty-six (46) fluidized cycles were run with this catalyst before introduction of antimony in feed.
² Same as preceding sample except that 96 more cycles were run with antimony-free feed.

These data show that the method of this invention can be practiced by introducing the treating agent into contact with the catalyst in the feed, either continuously or intermittently. In all runs made with that catalyst contacted with the antimony compound, coke and hydrogen yields were reduced and selectivity to gasoline was increased, indicating that the original detrimental effects of nickel were substantially overcome.

EXAMPLE III

A catalyst mixture comprised of 30 percent of cerium-exchanged, mole sieve-modified silica alumina and 70 percent of another commercial catalyst was subjected to the present invention process. The former catalyst was Davison XZ–25 available from Davison Chemical, Division of W. R. Grace & Co., Baltimore, Md. The latter catalyst was Americal Cyanamid TS–150 available from American Cyanamid Co., Wayne, N.J.

The catalyst had been used in a fluidized cracking operation and had been contaminated with nickel and vanadium during that operation.

The catalyst mixture had the following properties:

| | |
|---|---|
| Surface area, m.²/g. | 120 |
| Pore volume, ml./g. | 0.43 |
| Cerium, wt. percent | 0.59 |
| Sodium, wt. percent | 0.16 |
| Iron, wt. percent | 0.21 |
| Vanadium, wt. percent | 0.035 |
| Nickel, wt. percent | 0.057 |

The catalyst was employed in a cyclic fluidized cracking and regeneration sequence, employing a gas oil cracking stock containing antimony, the antimony having been added in the form of triphenylantimony.

Samples of the catalyst were removed from the fluid process after having been contacted during various periods with the feedstock containing the triphenylantimony and these catalyst samples were then individually evaluated in a fixed bed catalytic reactor.

Results are presented in Table III. In each instance, the data represent the average of three runs, one run being made at each of 7, 21 and 51 weight hourly space velocities. Results are expressed in the terms as previously defined.

TABLE III

| Fluid bed operation: Cumulative contact, moles Sb/mole Ni + V | 0 | 0.5 | 1.07 |
|---|---|---|---|
| Fixed bed operation: | | | |
| Conversion, vol. percent | 69.6 | 70.4 | 68.7 |
| Selectivity to gasoline, vol. percent | 72.5 | 66.7 | 64.2 |
| Hydrogen yield s.c.f./bbl. feed converted | 254 | 126 | 132 |
| Coke yield, wt. percent of feed | 7.2 | 6.2 | 4.2 |

These data illustrate that the method of this invention improves the performance of cracking catalyst contaminated with nickel and vanadium during extended cracking service.

It is evident from the foregoing that various modifications can be made to the method of this invention. Such, however, are considered as being within the scope of the invention.

What is claimed is:

1. In the method of restoring the activity of a molecular sieve zeolitic-modified silica-alumina hydrocarbon cracking catalyst in which the cracking activity of said catalyst is at least partially decreased by contamination with nickel or vanadium and is at least partially restored by heating said catalyst in the presence of a free oxygen-containing gas to elevated temperatures, the improvement comprising contacting said catalyst with an antimony compound selected from the group consisting of antimony oxide and antimony compounds convertible to antimony oxide to deposit said antimony compound on said catalyst and heating said catalyst and said antimony compound in the presence of a free oxygen-containing gas to said elevated temperature to regenerate said catalyst.

2. The method of claim 1 in which said catalyst is contacted with said antimony compound to deposit on said catalyst an amount of antimony in the range of from about 0.1 to about 2 moles per mole of contaminating metal present on said cracking catalyst.

3. The method of claim 1 in which said antimony compound is brought into contact with said catalyst by impregnation of said catalyst with a solution of said antimony compound.

4. The method of claim 1 in which said antimony compound is brought into contact with said catalyst by incorporating said antimony compound in said hydrocarbon.

5. The method of claim 4 in which said antimony compound is incorporated into said hydrocarbon in an amount in the range of from about 0.1 to about 5000 p.p.m. of said hydrocarbon.

6. The method of claim 1 in which said antimony compound comprises trihydrocarbyl-substituted antimony.

7. The method of claim 6 in which said antimony compound comprises triphenylantimony.

8. The method of claim 1 in which said antimony compound is brought into contact with said catalyst by dry mixing said antimony compound with said catalyst.

9. The method of claim 2 in which said catalyst is contaminated by nickel.

10. The method of claim 2 in which said catalyst is contaminated by vanadium.

References Cited

UNITED STATES PATENTS

| 2,758,097 | 8/1956 | Doherty et al. | 252—413 |
| 3,206,391 | 9/1965 | Gutberlet et al. | 208—110 |
| 3,248,316 | 4/1966 | Barger et al. | 208—58 |
| 3,390,074 | 6/1968 | Mulasky | 208—111 |
| 3,297,565 | 1/1967 | Garwood et al. | 208—111 |
| 3,140,253 | 7/1964 | Plank et al. | 208—120 |

DANIEL E. WYMAN, Primary Examiner

P. E. KONOPKA, Assistant Examiner

U.S. Cl. X.R.

252—411, 412, 413, 416; 208—120